Jan. 14, 1936.　　　A. C. HOFFMAN　　　2,027,822
BRAKE LINING DEVICE
Filed Feb. 27, 1935
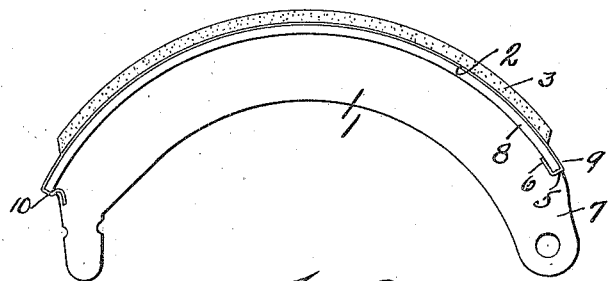
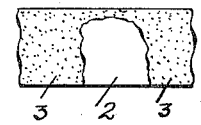
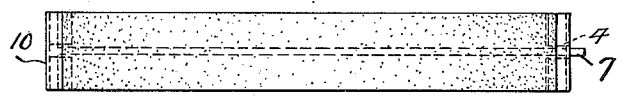
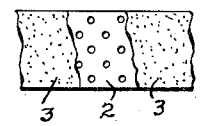
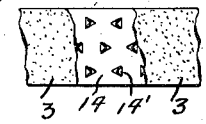
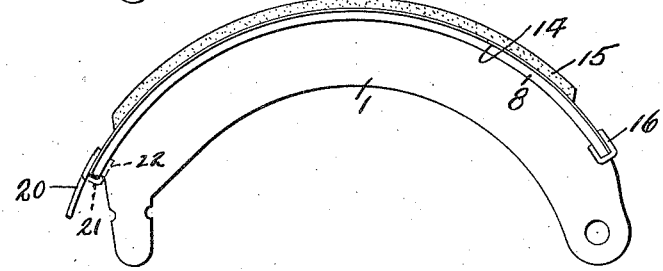
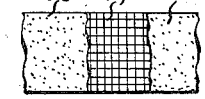
INVENTOR
ALLAN C. HOFFMAN
BY
Kiddle, Bethell and Montgomery
ATTORNEYS Patented Jan. 14, 1936

2,027,822

UNITED STATES PATENT OFFICE 2,027,822

BRAKE LINING DEVICE

Allan C. Hoffman, Englewood, N. J., assignor to Hoffman Brakes, Inc., New York, N. Y., a corporation of New York Application February 27, 1935, Serial No. 8,450

5 Claims. (Cl. 188—234)

My invention is directed to linings for brake shoes.

Primarily my invention is directed to linings for brakes of the internal expansion type as distinguished from the external contracting type, that is to say, to a brake structure where in applying the brake the convex surface of the brake lining is forced into frictional contact with the concaved inner surface of a brake drum.

In attaching brake linings to brake shoes under present practice it is universally customary to rivet the lining directly to the shoe. This necessitates the provision of rivet holes in the brake shoe and the provision of corresponding holes in the friction material or brake lining all of which adds to the cost of manufacture and is objectionable for reasons brought out hereinafter in some detail.

One of the objects of my invention is the provision of a brake lining in which the use of rivets is eliminated, and the lining is not attached directly to the shoe but to a one-piece steel strip or other metallic band or its equivalent, this metallic strip or band in turn being attached to the shoe in a new and novel manner as will be brought out hereinafter.

The brake lining may be secured to this attaching strip or metallic band, as, for example, by curing the lining to the same. For additional holding the band may be perforated or take the form of a wire mesh. Again, if desired the attaching band may be embedded in the lining.

A further object of my invention is the provision of brake lining equipment or a brake lining device which may be applied to the shoe in very materially less time than is required under present practice where the lining is riveted directly to the shoe as above pointed out, thus reducing the cost of initial lining as well as of later relining. In other words, my improved lining device is wrapped about the rim of the shoe under practically as much tension as may safely be applied to the device, thereby eliminating high spots due to general unevenness of the friction material caused by the rivet method heretofore employed, this general unevenness having a tendency to burn or score the brake drum. In fact it is sometimes necessary to grind the friction material to remove these high spots. Then again such unevenness causes noisy, chattering and grabbing brakes. By my invention these troubles are successfully eliminated, the lining device uniformly fitting the curved surface of the brake shoe, the wrapping tension furthermore creating a pressure contact between the lining device and the shoe, which is ideal for heat transfer purposes, the heat generated in the friction material of the lining flowing into the metallic attaching strip to be transferred directly to the brake shoe where it is dissipated.

In one embodiment of the present invention I have provided a construction wherein the metal attaching strip is provided with preformed hardened attaching fingers at its ends so that upon placing the strip under the wrapping tension above referred to the fingers can be interlocked with the ends of the brake shoe, thereby holding the band to the shoe under substantially the same wrapping tension as was employed in applying the device, so that upon the severest service conditions I am assured that there will not be any relative movement between the brake shoe and the lining.

Obviously a construction such as briefly outlined will reduce the cost of initially lining a set of brakes as well as the cost of relining to a minimum, and what is of equally great importance, will insure a continuous and uniformly curved braking or wearing surface as distinguished from the discontinuous and undulating surface provided by prior constructions wherein as above pointed out the lining material is riveted directly to the brake shoe.

The friction material employed in the practice of my invention may be woven, moulded, semi-moulded, etc. As above pointed out, where moulded or woven lining is employed, the same may be vulcanized or cured directly to the metallic attaching strip; additionally, as already mentioned, the attaching strip may be perforated, more firmly to unite the same and the friction material; on the other hand, short prongs may be struck up from the metal attaching strip upon which the friction material is impaled. In any event, however, it will be appreciated that the surface of the friction material which is to bear against the brake drum, due to the absence of rivet holes, is continuous and unbroken, and that the area of contact between friction material and shoe is correspondingly increased.

It will be appreciated, furthermore, that the life of the brake lining under my invention is materially increased over prior constructions owing to the absence of rivets, in that in those forms of my invention where the lining is cured to the attaching strip the lining may be worn down to the strip before it is necessary to reline.

It will be understood of course that the fabricating of the attaching strip and the securing of the lining material thereto is a factory job, probably done by automatic machinery, and that the two come to the brake shoe as a single unit ready for application.

In the accompanying drawing:

Fig. 1 is an elevational view of an embodiment of my invention;

Fig. 2 is a plan view of the embodiment of the invention shown in Fig. 1;

Fig. 3 is a fragmentary detail view showing one method of securing the friction material to the attaching band;

Fig. 4 is an elevational view of a further modification of the invention;

Fig. 5 is a view similar to Fig. 3 showing another method of securing the friction material to the attaching band;

Fig. 6 is an elevational view of still another modification of my invention showing the brake lining partially applied to the brake shoe;

Fig. 7 is a view similar to Fig. 3 showing still another method of securing the friction material to the attaching band;

Fig. 8 is a view similar to Fig. 6 illustrating a further modification of the invention; and Fig. 9 is a view similar to Fig. 3 showing a further method of securing the friction material to the attaching band.

Referring to the drawing in detail and first of all to Figs. 1, 2 and 3: I designates a brake shoe of conventional design of the internal expanding type. 2 designates a metallic band or strip of thin steel approximately of the same width as the face of the brake shoe I and to which is secured the friction material or brake lining 3. This friction material 3 may be woven, moulded, semi-moulded, etc. As illustrated in Fig. 3 the friction material is moulded and curved directly to the face of the attaching strip.

The fabricating of the attaching strip 2 and the attachment of the lining material 3 thereto is done by the manufacturer and comes to the job ready for application to the brake shoe.

The metal attaching strip 2 is appreciably longer than the friction material 3 thereby providing for the manufacturer to preform fingers at the projecting ends of the strip, by which the strip is eventually to be attached to the shoe. One end of the attaching strip is slotted as shown at 4. The end of the strip is thus preformed by being bent downwardly and rearwardly as shown at 5 and 6 to provide attaching fingers 9 which straddle the web 7 of the shoe and hook under the rim 8 of the shoe to interlock the end of the band with the shoe. These fingers are finally hardened as will be understood. The other end of the attaching strip 2 is slotted and provided with preformed hardened fingers 10.

The attaching strip 2 is of such length that in lining the shoe the preformed fingers 9 at one end of the strip are interlocked with or hooked over the end of the shoe as shown at the right in Fig. 1 and then the strip 2 wrapped about the face of the brake shoe under high tension, which may be only a few pounds short of the yield point of the strip and the fingers 10 snapped into interlocking relation to the end of the shoe. The fingers 10 as will be seen from the drawing are roughly S-shaped, so that in springing these fingers over the end of the shoe the lower curve of the S may slide lengthwise of the rim 8 of the shoe, while the fingers are being sprung open, to permit seating of the end of the shoe in the upper curve of the S.

The lining is therefore applied and held at all times under high wrapping tension, and inasmuch as the fingers 9 and 10 are of hardened metal considerable spring clamp action is developed so that all movement of the lining in service will be effectually prevented.

Inasmuch as the lining of the shoe I necessitates merely proper positioning of the fingers 9 at one end of the shoe and a wrapping under high tension of the attaching strip 2 about the shoe and snapping of the fingers 10 in place at the other end of the shoe, the time required for lining the shoe is reduced to the very minimum as compared with the universal practice of riveting the lining 3 directly to the brake shoe.

Furthermore much less skill is required of the mechanic to apply the lining device and the expense of riveting, drilling and counterboring are eliminated.

Inasmuch as the lining material 3 is attached directly to the strip 2 and the latter in turn wrapped about the shoe under high tension the strip 2 and friction material 3 will always be under high tension so that the attaching strip 2 will be in pressure contact with the face of the shoe I throughout its extent and the friction material 3 will contact with the attaching strip 2 throughout its extent, thereby providing an ideal construction for heat conducting and insuring a cooler brake at all times.

In the embodiment of my invention just described, the attaching strip 2 is a single piece of material of uniform thickness throughout but the attaching fingers are preformed and hardened so as to have a tension strength not less than the wrapping tension under which the lining device is applied.

If desired the fingers 9 and 10 may be made from separate pieces of metal and then welded in place on the ends of the attaching strip. Such a construction is shown in the embodiment of the invention illustrated in Figs. 4 and 5 in which 2 again designates the attaching strip and 3 the friction material, while 12 and 13 designate preformed metal fingers corresponding to the fingers 9 and 10 of Fig. 1, made from separate pieces of metal, welded or otherwise permanently secured to the attaching strip. These fingers are not necessarily hardened inasmuch as their greater thickness imparts the desired strength.

The friction material 3 is shown secured to the attaching strip 2 in the same way as mentioned in connection with Figs. 1 and 2, except that in addition the attaching strip is provided with perforations 2' into which the friction material is pressed in applying the friction material to the attaching strip. Application of the lining device to the brake shoe is accomplished in the same fashion as explained above.

In Figs. 6 and 7 I have shown a further modification of my invention. In these Figures the metallic attaching strip is designated 14 and the friction material 15. The friction material is secured to the attaching strip by prongs 14'. At one end the attaching strip is provided with hardened preformed fingers 16 similar to the fingers 9 of Fig. 1. In this instance when lining the shoe the fingers 16 are interlocked with one end of the shoe, and the attaching strip with the friction material 15 secured thereto is wrapped under high tension about the shoe, and the projecting end 17 of the strip, which has been previously slotted to accommodate the web 7 of the shoe, is bent downwardly and rearwardly as indicated on the drawing in dotted lines and designated 18 and 19, respectively. During this entire procedure the tension on the attaching strip at any time is at least as high as the initial tension.

In the embodiment of my invention shown in Figs. 8 and 9 the attaching strip or metallic band 14 is in the form of a wire mesh, and fingers 16 separately fabricated are welded or otherwise rigidly and permanently secured to one end of this strip. The fingers 16 may be of the same gauge as the strip, or of heavier gauge metal as illustrated. At the other end of the attaching strip I provide a short piece of metal 20 illustrated as of heavier gauge than the attaching strip, which is welded or otherwise permanently secured to the attaching strip. The lining device of this embodiment of my invention is applied to the shoe in the same fashion as pointed out in connection with Figs. 6 and 7.

It will be seen from the foregoing that in each embodiment of my invention I have provided a brake lining device in which the surface of the friction material is continuous; that the friction material is secured to a metallic band which in turn is applied to and held upon the brake shoe under wrapping tension; and that in all cases the attaching means, whether in the nature of preformed hardened fingers or of heavy gauge metal, has a tension strength at least as high as the wrapping tension under which the device is applied to the brake shoe, so as to withstand, without permanent deflection, application of the lining device to the shoe under high wrapping tension.

What I claim is:—

1. Brake mechanism comprising in combination a brake shoe, a strip of friction material, a metallic band to which said material is secured, said band being wrapped about said shoe, and means at each end of said band for holding the same in position on the shoe, one of said holding means being so constructed that when the band is in place on the shoe the said holding means will exert a wrapping tension on the metallic band.

2. Brake mechanism comprising in combination a brake shoe, a strip of friction material, a metallic band to which said material is secured, said band being wrapped about said shoe under tension, and preformed attaching fingers at the ends of said band for holding the same in position on the shoe, one of said fingers being so constructed that when the band is in place on the shoe the said finger will exert a wrapping tension on the metallic band.

3. A brake lining for brakes of the internal expansion type, comprising in combination a strip of friction material, a metallic band to which said friction material is secured, and attaching fingers at the ends of said metallic band, the fingers at one end of said band being of spring metal of greater thickness than the body of the band and so constructed that when the band is in place on a brake shoe the said last mentioned fingers will exert a wrapping tension on the band.

4. Brake mechanism comprising in combination a brake shoe, a strip of friction material, a metallic band to which said friction material is secured, said band being wrapped about said shoe and attaching fingers at the ends of said metallic band the fingers at one end of said band being of spring metal of greater thickness than the body of the band and so constructed that when the band is in place on a brake shoe the said last-mentioned fingers will exert a wrapping tension on the band.

5. A brake mechanism comprising in combination a brake shoe, a strip of friction material, a metallic band to which said friction material is secured, preformed hardened fingers at each end of said band for holding the band in position on to said shoe, the fingers at one end of said band being so constructed that when the band is in place on the shoe, the said last-mentioned fingers will exert a wrapping tension on the metallic band.

ALLAN C. HOFFMAN.